US011230210B1

(12) United States Patent
Nageshkar et al.

(10) Patent No.: US 11,230,210 B1
(45) Date of Patent: Jan. 25, 2022

(54) STRAP ASSEMBLY FOR CARRIER DETACHMENT

(71) Applicant: Ford Global Technologies, LLC, Dearborn, MI (US)

(72) Inventors: Vishal Vinayak Nageshkar, Farmington Hills, MI (US); Sangram Laxman Tamhankar, Canton, MI (US); Patrick Maloney, Livonia, MI (US); Kevin VanNieulande, Fraser, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/097,686

(22) Filed: Nov. 13, 2020

(51) Int. Cl.
*B60N 2/90* (2018.01)
*A47C 4/30* (2006.01)
*B60N 2/30* (2006.01)

(52) U.S. Cl.
CPC .............. *B60N 2/90* (2018.02); *A47C 4/30* (2013.01); *B60N 2/30* (2013.01)

(58) Field of Classification Search
CPC ...... A47C 4/30; B60N 2/2806; B60N 2/2809; B60N 2/90; B60R 2022/1806
See application file for complete search history.

(56) References Cited

U.S. PATENT DOCUMENTS

| | | | | |
|---|---|---|---|---|
| 5,690,384 A * | 11/1997 | Rossi | ...................... | B60N 2/58 297/228.13 |
| 5,987,717 A * | 11/1999 | Peterson | ............ | A44B 11/2526 24/637 |
| 6,702,242 B1 * | 3/2004 | Ziaylek, Jr. | ............... | B60N 2/24 248/154 |
| 7,252,343 B1 * | 8/2007 | Pence | .................. | B60N 2/2806 280/805 |
| 7,503,535 B2 * | 3/2009 | Ziaylek | .................... | A62B 9/04 248/313 |
| 7,621,580 B2 * | 11/2009 | Randjelovic | ......... | B60N 2/0735 296/65.13 |
| 8,459,735 B2 * | 6/2013 | van Zyl | ................... | B60N 2/38 297/188.05 |
| 8,505,171 B2 * | 8/2013 | Colorado | ................. | A62B 9/04 24/3.7 |
| 8,646,158 B2 * | 2/2014 | Buckingham | ........ | B60N 2/2806 24/599.1 |
| 8,764,113 B2 | 7/2014 | Smith et al. | | |
| 9,738,186 B2 * | 8/2017 | Krueger | ............... | B60N 2/4242 |
| 9,840,204 B2 * | 12/2017 | Hammarskjold | ........ | B60N 2/22 |
| 9,932,012 B1 | 4/2018 | Line et al. | | |
| 10,046,682 B2 | 8/2018 | Line et al. | | |

(Continued)

FOREIGN PATENT DOCUMENTS

DE 102010022626 A1 12/2011
EP 2090458 A2 * 8/2009 ........... B60N 2/2806

(Continued)

*Primary Examiner* — Timothy J Brindley

(74) *Attorney, Agent, or Firm* — David Coppiellie; Price Heneveld LLP

(57) ABSTRACT

A vehicle seating assembly includes a frame with an engagement portion, a carrier, and a strap disposed between the frame and the carrier, wherein if the carrier is in an attached position relative to the frame, then application of an actuating force to the strap moves the carrier to a detached position relative to the frame.

16 Claims, 13 Drawing Sheets

(56) References Cited

U.S. PATENT DOCUMENTS

| | | | |
|---|---|---|---|
| 10,081,282 B2 | 9/2018 | Line et al. | |
| 10,532,677 B2 | 1/2020 | Line et al. | |
| 10,569,676 B1* | 2/2020 | Wilson | B60N 2/688 |
| 2003/0122407 A1* | 7/2003 | Boyd | B60N 2/7005 |
| | | | 297/130 |
| 2010/0084897 A1* | 4/2010 | Greenwood | B60N 2/1685 |
| | | | 297/217.7 |
| 2011/0057490 A1* | 3/2011 | Xiao | B60N 2/2875 |
| | | | 297/256.13 |
| 2014/0035338 A1* | 2/2014 | Greenwood | B60R 22/12 |
| | | | 297/344.12 |
| 2014/0265489 A1* | 9/2014 | Morgenstern | B60N 2/2851 |
| | | | 297/256.15 |
| 2017/0217338 A1* | 8/2017 | Sammons | B60N 2/90 |
| 2018/0001792 A1* | 1/2018 | Bruck | B60N 2/0856 |
| 2018/0222439 A1* | 8/2018 | Eaton | A44B 11/2549 |
| 2019/0241151 A1* | 8/2019 | Vega | B60R 22/26 |
| 2020/0122609 A1* | 4/2020 | Booth | B60N 2/2806 |
| 2020/0163418 A1* | 5/2020 | Morgan | A44B 11/12 |
| 2020/0298792 A1* | 9/2020 | Eaton | B60R 22/28 |
| 2021/0120960 A1* | 4/2021 | Bishop | A47C 4/283 |

FOREIGN PATENT DOCUMENTS

| | | | | |
|---|---|---|---|---|
| GB | 2424921 A | * | 10/2006 | B60N 2/2887 |
| WO | WO-2018081471 A1 | * | 5/2018 | A47C 31/04 |
| WO | 2020169447 A1 | | 8/2020 | |

* cited by examiner

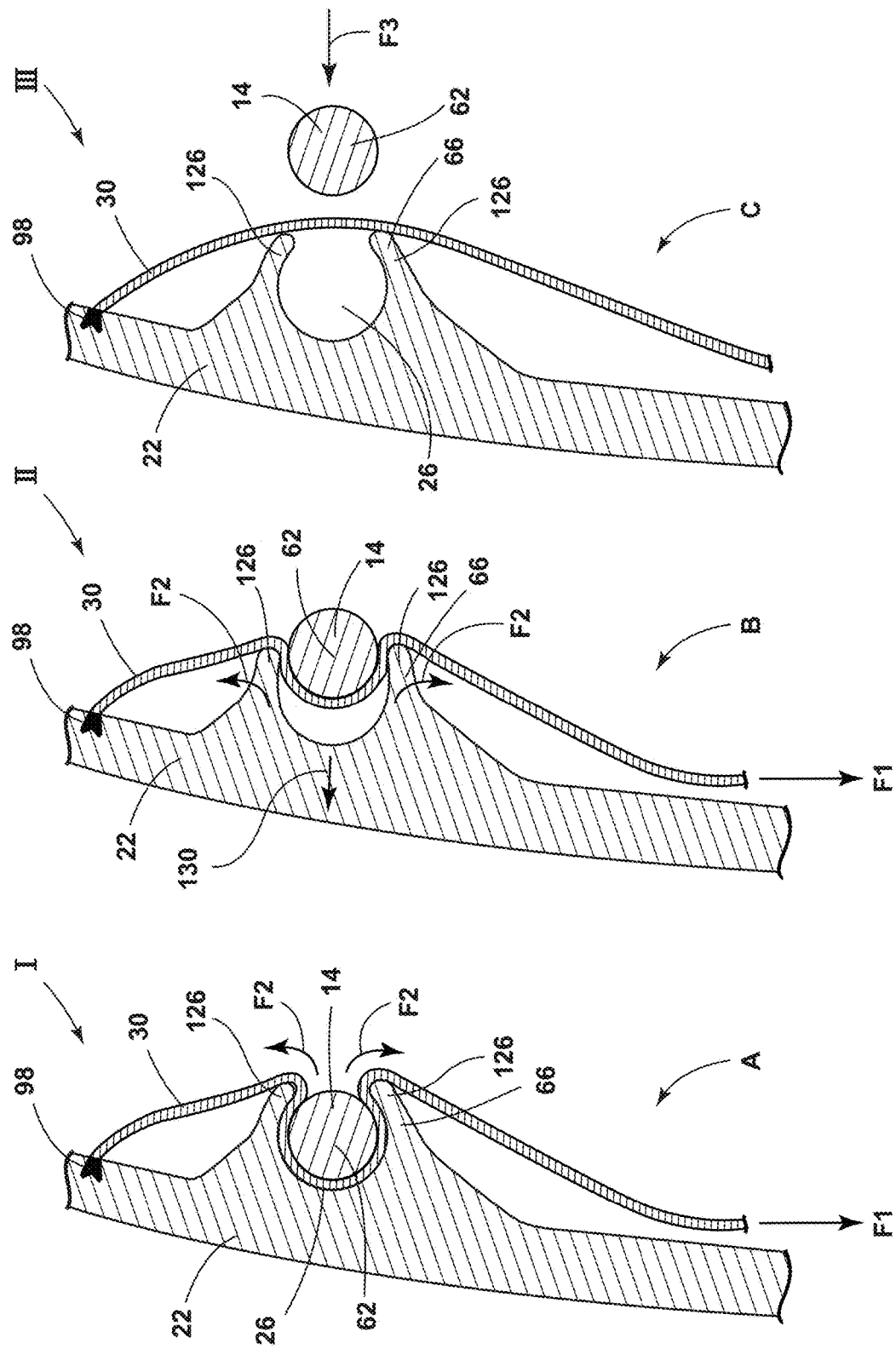

STRAP ASSEMBLY FOR CARRIER DETACHMENT

FIELD OF THE DISCLOSURE

The present disclosure generally relates to a vehicle seating assembly with a detachable portion, and more particularly, to a detachable seating surface portion for a vehicle seating assembly.

BACKGROUND OF THE DISCLOSURE

Vehicle seating assemblies may include detachable seating surface portions. Removable seating surface portions may be used to change the visual appearance of the seating assembly or to provide variations in seating assembly functionality.

SUMMARY OF THE DISCLOSURE

According to one aspect of the present disclosure, a vehicle seating assembly includes a frame with an engagement portion, a carrier, and a strap disposed between the frame and the carrier, wherein if the carrier is in an attached position relative to the frame, then application of an actuating force to the strap moves the carrier to a detached position relative to the frame.

Embodiments of the first aspect of the disclosure can include any one or a combination of the following features:
- a runner disposed in the carrier for receiving the strap;
- a hook extending from the carrier and positionable around the frame when the carrier is in the attached position;
- the strap comprises a plurality of straps;
- the plurality of straps each include a first end coupled to the frame and a second end coupled to a joining member disposed in a central portion of the frame;
- the actuating force is exerted on the joining member to detach the carrier from the frame;
- a pull member extending away from the joining member, wherein the actuating force is exerted on the pull member to detach the carrier from the frame;
- the joining member includes a ring;
- the engagement portion of the frame includes a substantially cylindrical portion, wherein the carrier includes a frame clamp, and wherein the substantially cylindrical portion and the frame clamp form an interference fit to secure the carrier to the frame; and
- the engagement portion of the frame includes an aperture for receiving a clamp disposed on an end of the strap, wherein the clamp is movable between collapsed and extended positions, and wherein the clamp is configured to secure the strap to the frame.

According to a second aspect of the present disclosure, a seating assembly includes a frame with an engagement portion, a carrier, and a strap assembly arrangeable in a fixed position and a released position with a strap including a first end and a second end, wherein the strap is fixedly secured to the frame if the strap assembly is in the fixed position, and wherein if an actuating force is applied to the strap, then the strap moves from the fixed position to the released position to detach the carrier from the frame.

Embodiments of the second aspect of the disclosure can include any one or a combination of the following features:
- a runner for receiving the strap disposed in the carrier and substantially transverse to the engagement portion of the frame;
- the runner includes a recess;
- the runner includes a slot;
- the engagement portion of the frame includes a substantially cylindrical portion and wherein the carrier includes a frame clamp for receiving the substantially cylindrical portion;
- the engagement portion of the frame includes an aperture and wherein the strap includes a clamp positionable in the collapsed position and an expanded position;
- the strap incudes a plurality of straps and wherein each of the plurality of straps includes a first end disposed proximate a perimeter of the frame and a second end coupled to a joining member disposed proximate a central portion of the frame; and
- the joining member is disposed between the frame and the carrier.

According to a third aspect of the present disclosure, a method of assembling a vehicle seating assembly includes positioning the strap assembly between a frame and a carrier, securing the carrier to the frame; and exerting an actuating force on the strap assembly so that the strap assembly detaches the carrier from the frame.

Embodiments of the third aspect of the disclosure can include any one or a combination of the following features:
- positioning a plurality of straps of the strap assembly in a corresponding plurality of runners of the carrier; and
- arranging the plurality of straps so that a first end of each of the plurality of straps is fixed to an outer location of the frame and a second end of each of the plurality of straps is coupled to a joining member disposed at an inner location of the frame.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 5 is a cross-sectional view of a frame, a strap, and a carrier with the carrier in the attached position and the strap in the fixed position, according to an aspect of the present disclosure;

FIG. 6 is a cross-sectional view of the frame, the strap, and the carrier of FIG. 5 with the carrier in the intermediate position and the strap in the intermediary position, according to an aspect of the present disclosure;

FIG. 7 is a cross-sectional view of the frame, the strap, and the carrier of FIG. 5 with the carrier in the detached position and the strap in the released position, according to an aspect of the present disclosure;

DETAILED DESCRIPTION

Figure 2:
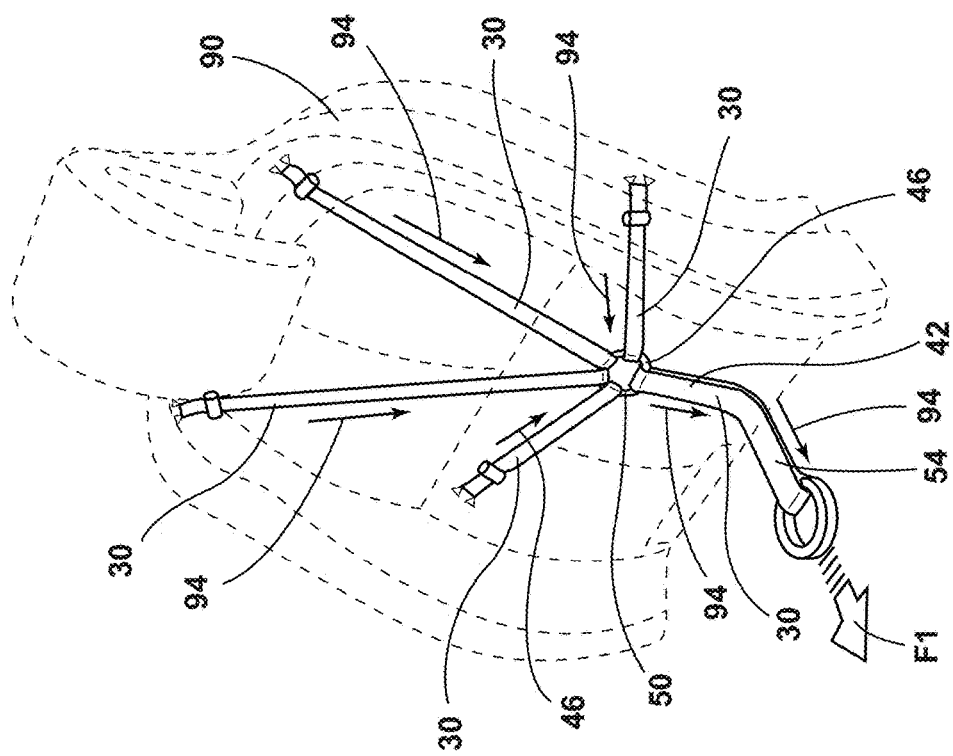
FIG. 2 is a side perspective view of a seatback with a strap assembly, according to an aspect of the present disclosure.

For purposes of description herein, the terms "upper," "lower," "right," "left," "rear," "front," "vertical," "horizontal," "interior," "exterior," and derivatives thereof shall relate to the disclosure as oriented in FIG. 2. However, it is to be understood that the disclosure may assume various alternative orientations, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-13, a vehicle seating assembly 10 includes a frame 14 including a substantially cylindrical portion 18, a carrier 22 including a substantially concave depression 26 for receiving the substantially cylindrical portion 18, and a strap 30 disposed between the substantially cylindrical portion 18 and the substantially concave depression 26 and transverse to the substantially cylindrical portion 18. If the carrier 22 is in the attached position I relative to the frame 14, then the substantially cylindrical portion 18 and the substantially concave depression 26 form an interference fit 34. A force (actuating force F1) is applied to the strap 30 to move the carrier 22 from the attached position I to the detached position III.

Vehicle occupants may desire a change in the appearance of a vehicle interior. The appearance of a vehicle interior may be changed by changing the seating assembly carrier 22. The seating assembly carrier 22 may include a cushion or other support that constitutes the seating surface. Occupants may want to replace dirty, ripped, or damaged seating assembly carriers 22 with new seating assembly carriers 22. Seating assembly carriers 22 may be sold as aftermarket items. Seating assembly carriers 22 may also be installed during the seating assembly manufacturing process. During the seating assembly manufacturing process, operators may conveniently attach the seating assembly carriers 22 to the seating assemblies 10. When ordering a car from an Original Equipment Manufacturer, customers may be able to select a seating assembly carrier 22 from a wide selection of available seating assembly carriers 22.

It may be desirable for a seating assembly 10 to include a seating assembly carrier 22 that may be easy to attach to and detach from a seating assembly frame 14. The seating assembly carrier 22 may include a strap assembly 42 that may provide for convenient detachment of a seating assembly carrier 22 from the seating assembly frame 14. The seating assembly carrier 22 may be conveniently attached to the seating assembly frame 14 through a press fit attachment (for example, interference fit 34).

Figure 1:
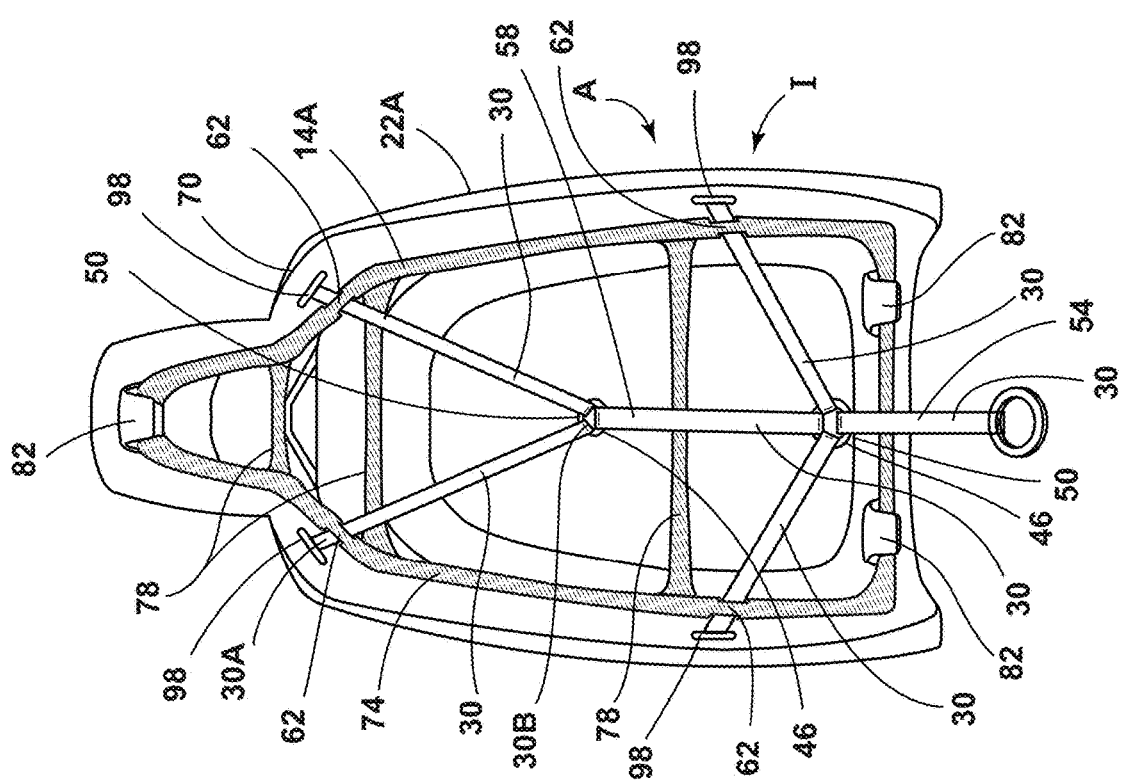
FIG. 1 is a back elevational view of a strap assembly, a seatback frame, and a seatback carrier, according to an aspect of the present disclosure.

Referring to FIG. 1, a strap assembly 42 is shown with portions of the strap assembly 42 disposed between a seatback frame 14A and a seatback carrier 22A. The strap assembly 42 may include one or more straps 30 and joining members 46 disposed at junctions 50 of the straps 30. The straps 30 may include first ends 30A and second ends 30B. The first ends 30A of the straps 30 may be coupled to the seatback frame 14A. The second ends 30B of the straps 30 may be coupled to a joining member 46 disposed at a junction 50 of the straps 30. The joining member 46 may be a ring, a triangular-shaped metal piece, or other fastener. The one or more joining members 46 may be disposed in a central portion of the frame 14. The first ends 30A of the straps 30 may be disposed at outer locations of the frame 14. The second ends 30B of the straps 30 may be disposed at inner locations of the frame 14.

With reference again to FIGS. 1-13, the first ends 30A of the straps 30 may be disposed between the seatback frame 14A and the seatback carrier 22A. The first ends 30A of the straps 30 may be disposed between an engagement portion 62 of the frame 14 and a frame clamp 66 of the carrier 22. The strap assembly 42 may include a strap 30 that functions as a pull member 54. The strap assembly 42 may include a strap 30 that may function as a connector 58 between two joining members 46.

With continued reference to FIG. 1, in the aspect shown, a seatback frame 14A may be disposed within the outer perimeter 70 of the seatback carrier 22A. The seatback carrier 22A may include a headrest area. The seatback frame 14A may include a perimeter portion 74 and cross members 78 extending between opposing sides of the perimeter portion 74. The seatback frame 14A may include a headrest area. The seatback frame 14A may be made of various materials, including metals and composites. The seatback frame 14A may be manufactured with additive manufacturing. The seatback frame 14A may include a substantially cylindrical rod or a tubular member with a hollow inside. The seatback carrier 22A may include one or more hooks 82 or similar members for positioning the seatback carrier 22A on the seatback frame 14A.

With reference to FIGS. 1-2, the strap assembly 42, according to another aspect, is shown disposed within a seatback 90. The strap assembly 42 may include straps 30 and a joining member 46. The strap assembly 42 may be moved from the fixed position A to the released position C by exerting an actuating force F1 on the pull member 54. The actuating force F1 may cause the straps 30 to move in the direction shown by arrows 94. The first ends 30A of the straps 30 may be fixedly coupled to the carrier 22A at attachment points 98. The second ends 30B of the straps 30 may be coupled to the joining member 46. If the actuating force F1 is exerted on the strap assembly 42 to move the straps 30 from fixed positions A to released positions C, then the seatback carrier 22A may move from the attached position I to the detached position III.

Figure 3:
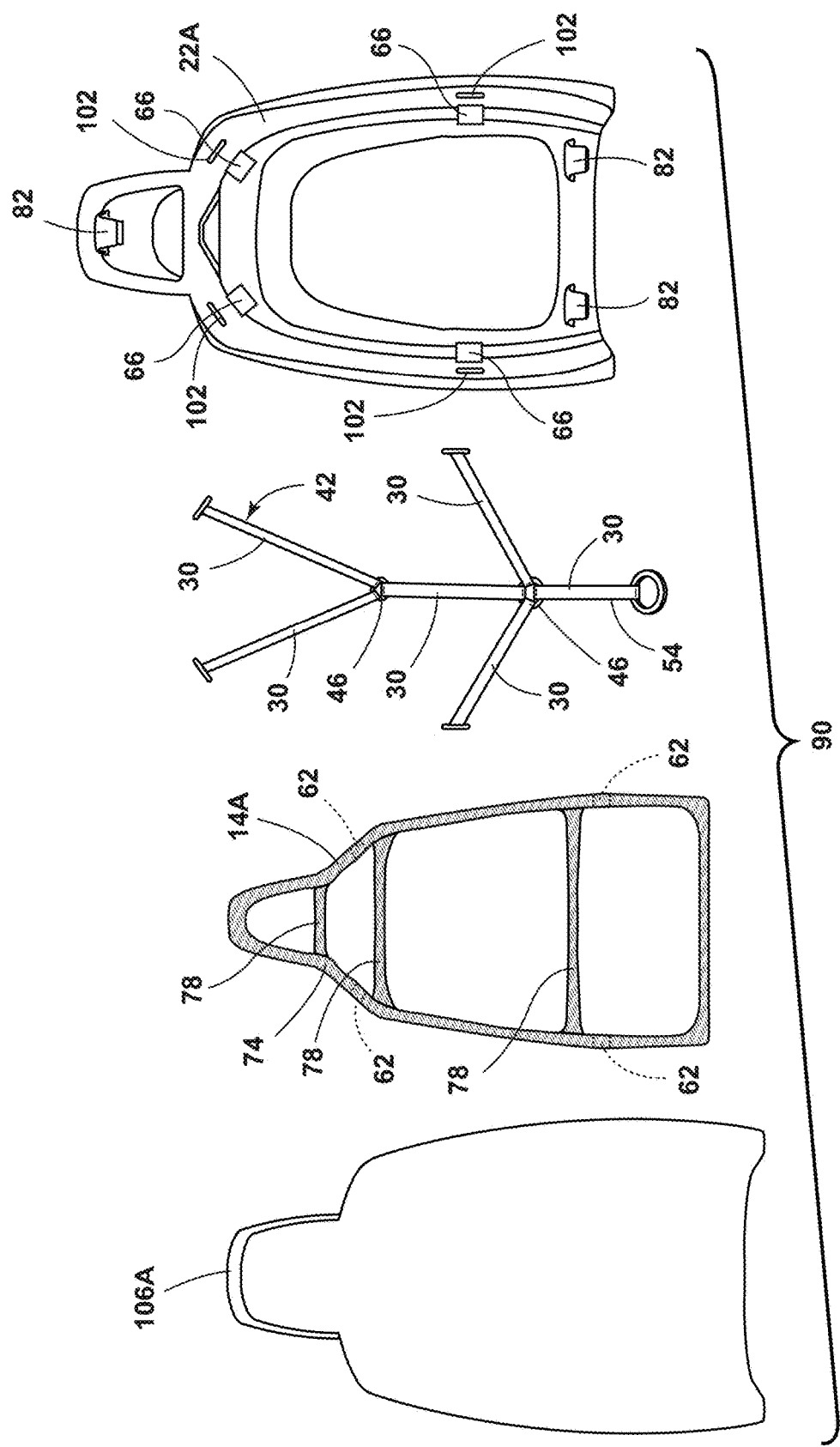
FIG. 3 is an exploded view of a seatback carrier, a strap assembly, a seatback frame, and a seatback base, according to an aspect of the present disclosure.

Referring now to FIG. 3, an exploded view is shown of a seatback 90. The seatback 90 may include the seatback carrier 22A, the strap assembly 42, the seatback frame 14A, and the seatback base 106A. The seatback carrier 22A may include frame clamps 66 for receiving the engagement portions 62 of the frame 14. The frame clamps 66 may be molded or otherwise formed into the carrier 22A. In various aspects, the frame clamps 66 may be separate pieces secured to the seatback carrier 22A. The seatback carrier 22A may also include apertures 102 for receiving the first ends 30A of the straps 30. The first ends 30A of the straps 30 may be fastened to the apertures 102 or routed into the apertures and fastened to the inside of the seatback carrier 22A. Attachment points 98 may be located proximate the apertures 102. (FIGS. 1, 4B-7.)

Figure 4B:
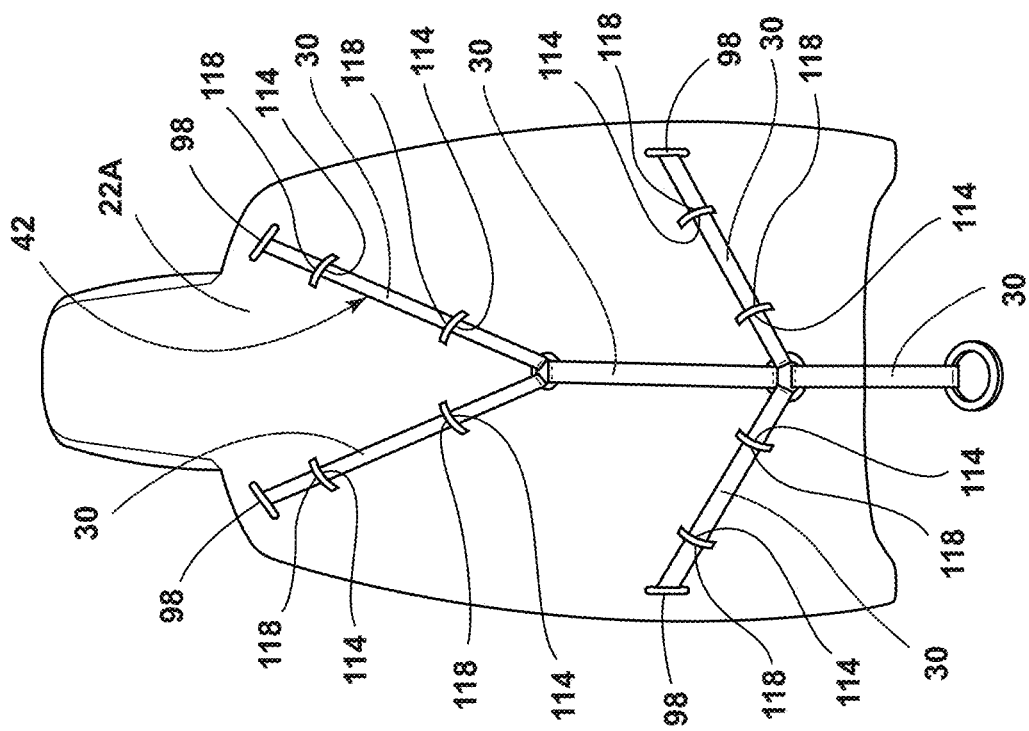
FIG. 4B is a back elevational view of a seatback carrier with slots for receiving straps, according to an aspect of the present disclosure.
Figure 4A:
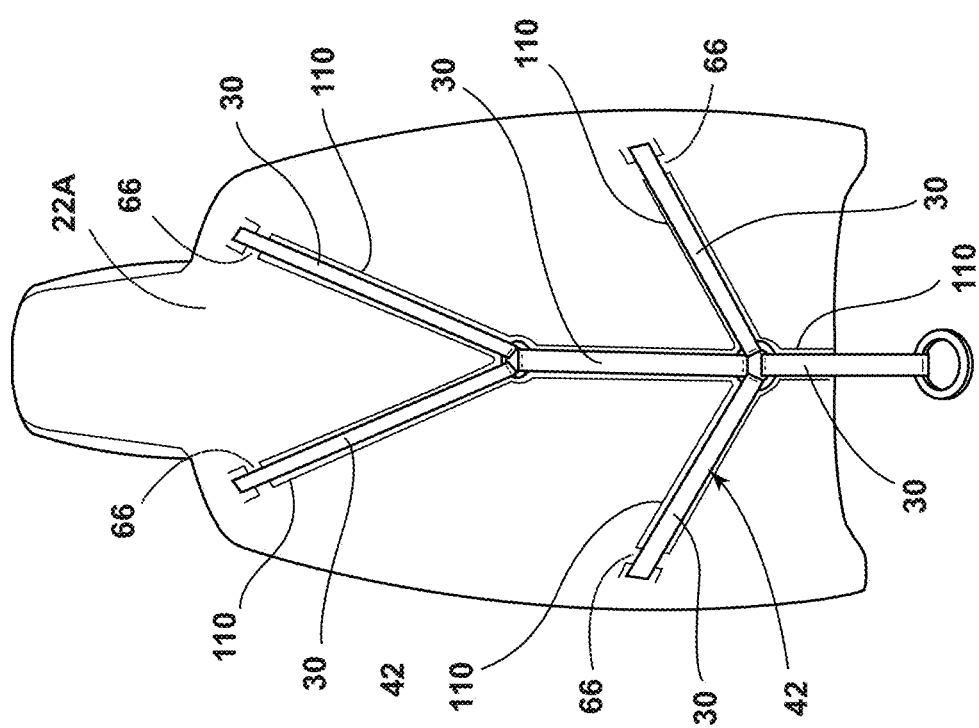
FIG. 4A is a back elevational view of a seatback carrier with recesses for receiving straps, according to an aspect of the present disclosure.
Figure 8:
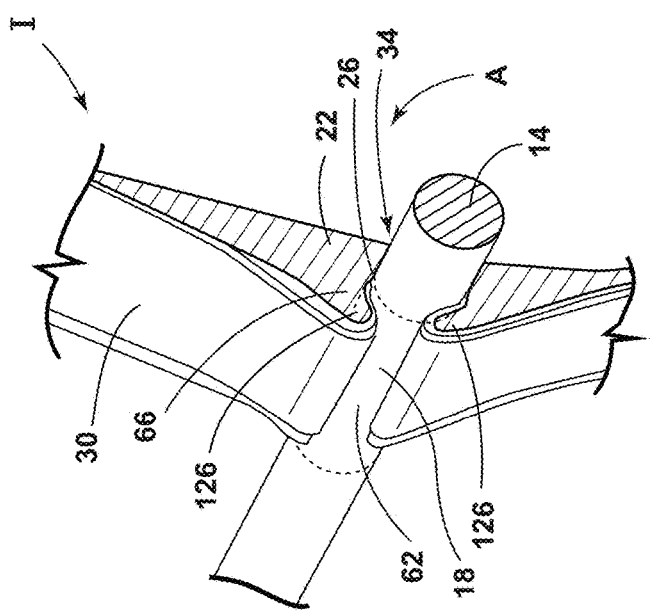
FIG. 8 is a side perspective view of a frame, a strap, and a carrier with the carrier in the attached position and the strap in the fixed position, according to an aspect of the present disclosure.
Figure 10:
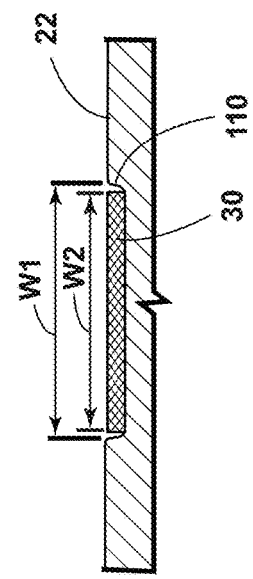
FIG. 10 is a side view of a strap disposed in a recess in a carrier, according to an aspect of the present disclosure.

Referring to FIG. 4A, a back elevational view of the seatback carrier 22A is shown. The strap assembly 42 is shown disposed in recesses 110 of the seatback carrier 22A. Recesses 110 may be disposed in the seatback carrier 22A. Recesses 110 are shown molded or otherwise formed into the seatback carrier 22A. The recesses 110 may receive the straps 30. The recesses 110 may provide space for the straps 30 to fit between the seatback carrier 22A and the seatback base 106A. The recesses 110 may also maintain each strap 30 in a substantially transverse position relative to the perimeter portion 74 of the seatback frame 14A. FIG. 10 shows a cross-sectional view of a strap 30 disposed within a recess 110. The recess 110 may be an indentation in the carrier 22 configured to house the strap 30 so that the top of the strap 30 may be aligned with the surface of the carrier 22. The width W1 of the recess 110 may be slightly wider than the width W2 of the strap 30. With reference again to FIG. 4A, the frame clamps 66 are shown in the seatback carrier 22A. As shown in FIG. 8, the frame clamps 66 may form an interference fit 34 with the engagement portions 62 of the frame 14 when the carrier 22 is in the fixed position A relative to the frame 14.

Figure 11:
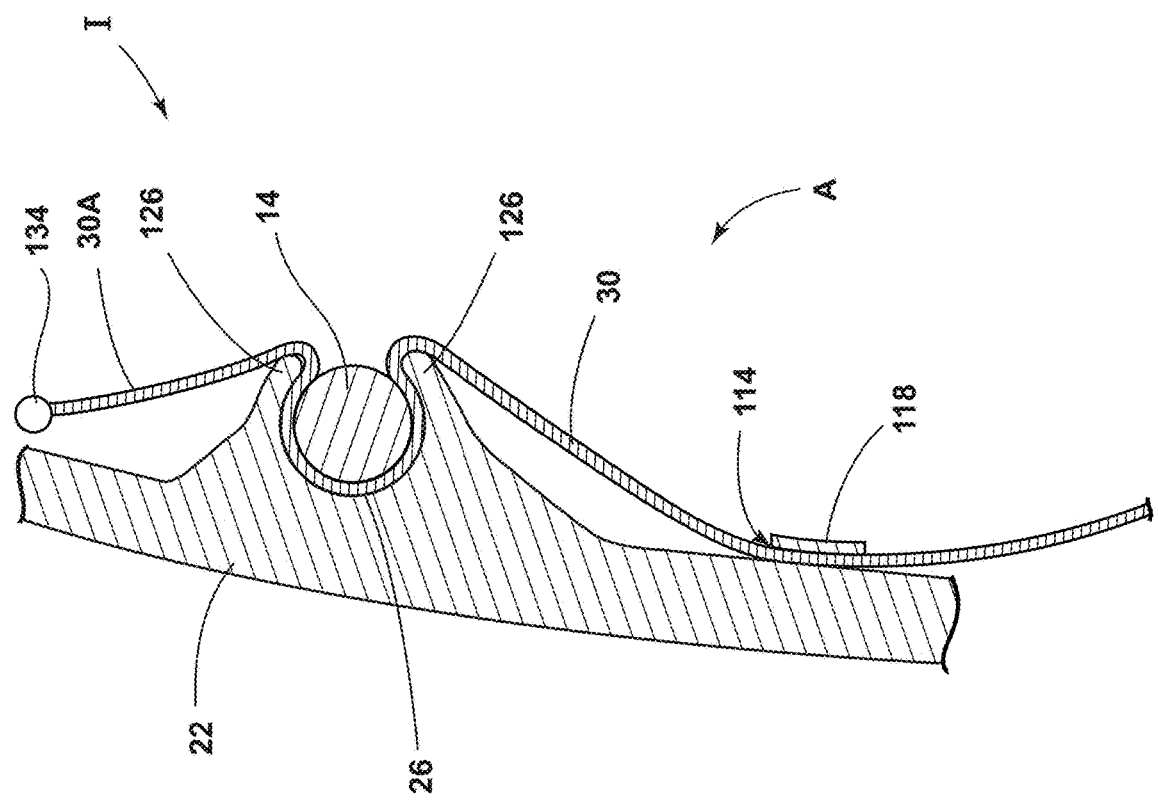
FIG. 11 is a side perspective view of a frame, a strap, and a carrier with the carrier in the attached position, the strap in the fixed position, and the strap disposed in a slot of the carrier, according to an aspect of the present disclosure.

Referring to FIG. 4B, the strap assembly 42 is shown disposed through slots 114 of the seatback carrier 22A. A cross member 118 extending from the seatback carrier 22A may define a slot 114. A slot 114 may be used instead of or in addition to a recess 110 to maintain the strap 30 in position relative to the seatback carrier 22A and the engagement portion 62 of the seatback frame 14A. The slots 114 may maintain the straps 30 in a transverse position relative to the engagement portions 62 of the seatback frame 14A. The slots 114 may also maintain the straps 30 in flat positions relative to the seatback carrier 22A. A slot 114 and a cross member 118 are also shown in FIG. 11.

The term runner may be used to describe means for maintaining the strap 30 in position relative to the carrier 22. The term runner may include a recess 110, a slot 114, and/or any other structure for maintaining the strap 30 in a position relative to the carrier 22 and/or the frame 14.

With reference to FIGS. 5-7, a carrier 22 with a frame clamp 66 and a frame 14 with an engagement portion 62 are shown. The frame clamp 66 may include a pair of opposing arms 126 that may extend toward one another. Each of the pair of opposing arms 126 may be bendable. Each of the pair of opposing arms 126 may be resilient and flexible so that they return to their substantially original shape after numerous cycles of attaching the carrier 22 to the frame 14 and detaching the carrier 22 from the frame 14. A strap 30 may be disposed between the frame clamp 66 and the engagement portion 62. With reference to FIG. 5, the carrier 22 is shown in the attached position I relative to the frame 14. The strap 30 is shown in the fixed position A relative to the carrier 22 and the frame 14. The strap 30 is shown attached to the carrier 22 at attachment point 98. An actuating force F1 may be exerted on the strap 30 to detach the carrier 22 from the frame 14.

With reference to FIG. 6, the carrier 22 is shown in the intermediate position II relative to the frame 14. The strap 30 is shown in the intermediary position B relative to the carrier 22 and the frame 14. An actuating force F1 is shown applied to the strap 30. The actuating force F1 causes the strap 30 to become taunt. The actuating force F1 causes the strap 30 to move the carrier 22 off of the frame 14 in the direction shown by arrow 130. The movement of the carrier 22 off of the frame 14 causes the pair of opposing arms 126 that extend toward one another to move apart from one another as the carrier 22 is detached from the frame 14. The frame 14 may exert responsive forces F2 against the pair of opposing arms 126 of the carrier 22 as the strap 30 moves the carrier 22 away from the frame 14.

Referring to FIG. 7, the carrier 22 is shown in the detached position III relative to frame 14. The strap 30 remains attached to the carrier 22 at the attachment point 98. In various aspects, the strap 30 may be attached to the frame 14 or a vehicle interior.

Referring to FIG. 8, a perspective view is shown of a substantially concave depression 26 in the carrier 22 disposed around a substantially cylindrical portion 18 of the frame 14. The pair of opposing arms 126 is shown partially encircling the substantially cylindrical portion 18. The carrier 22 is shown in the attached position I. The strap 30 is shown in the fixed position A.

Figure 9:
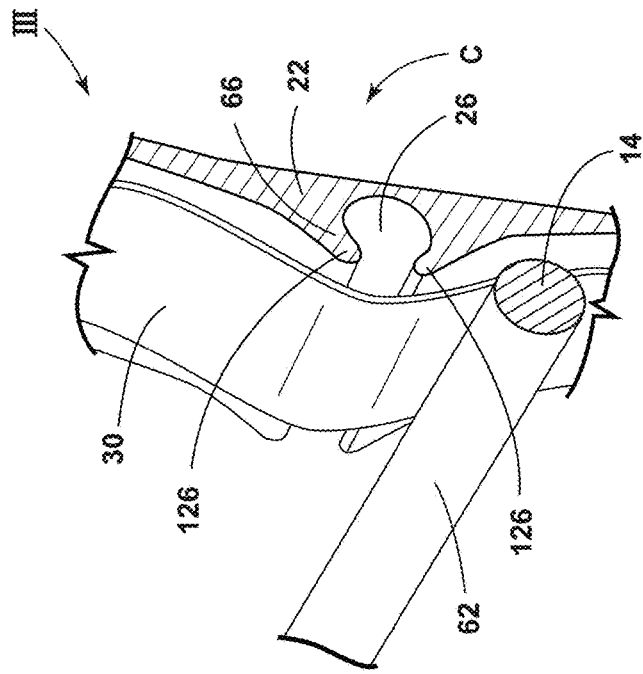
FIG. 9 is a side perspective view of the frame, the strap, and the carrier of FIG. 8 with the carrier in the detached position and the strap in the released position, according to an aspect of the present disclosure.

Referring to FIG. 9, a perspective view is shown of the carrier 22 detached from the frame 14. The strap 30 is disposed between the carrier 22 and the frame 14. The carrier 22 is in the detached position III. The strap 30 is in the released position C.

With reference to FIG. 10, the strap 30 is shown disposed in a recess 110 of the carrier 22.

Referring now to FIG. 11, a cross-sectional view is shown of a carrier 22, a strap 30, a frame 14, and a cross member 118 of a slot 114. A bead 134 is shown disposed at the first end 30A of the strap 30. In various aspects, the bead 134 may be coupled to the carrier 22A at the attachment point 98. The carrier 22 is shown in the attached position I. The strap 30 is shown in the fixed position A.

Figure 12:
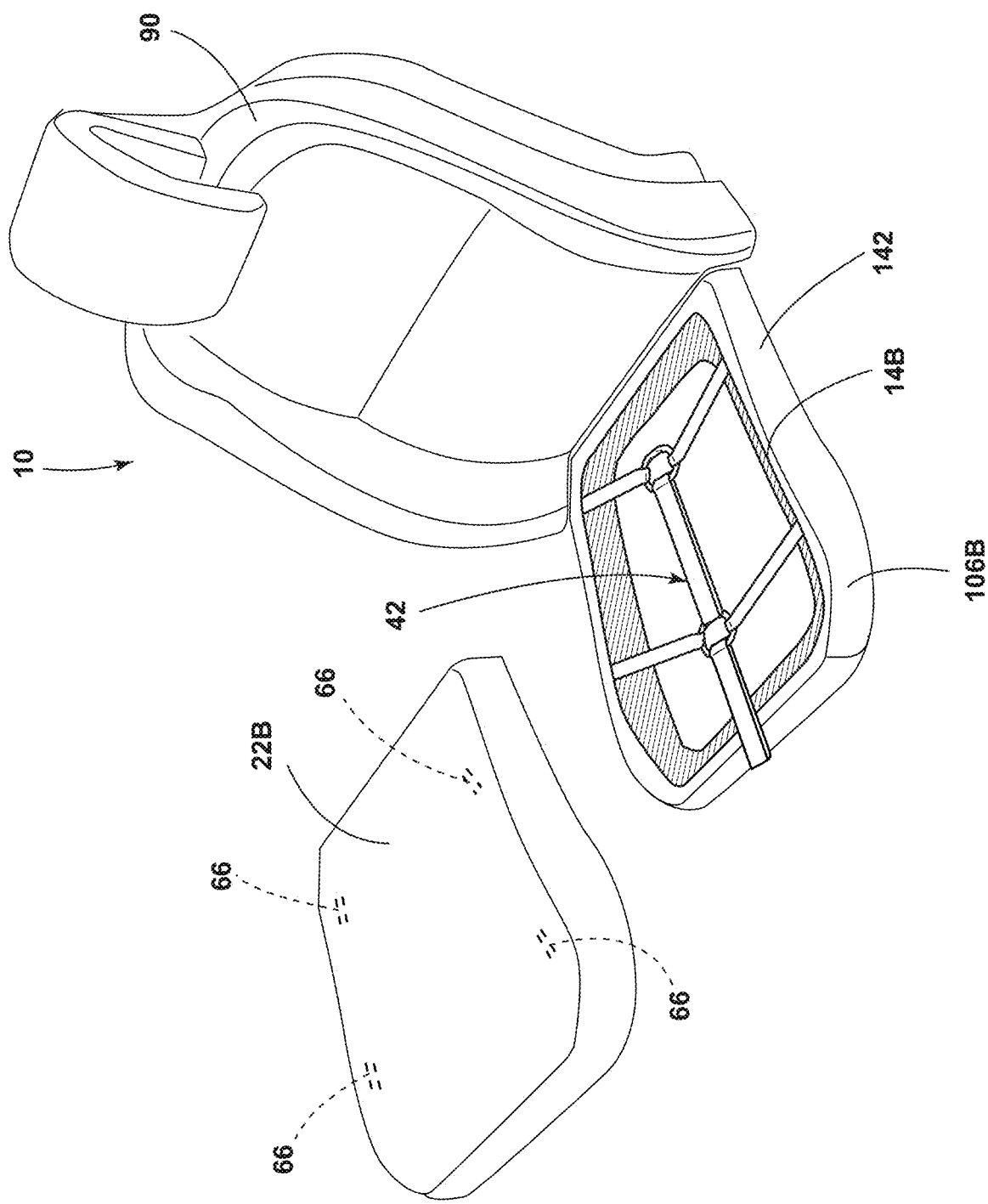
FIG. 12 is a perspective view of a seating assembly with a seat carrier, a strap assembly, a seat frame, and a seat base, according to an aspect of the present disclosure.

With reference now to FIG. 12, a seating assembly 10 is shown with the seat 142 including a seat carrier 22B, a strap assembly 42, a seat frame 14B, and a seat base 106B. The seat carrier 22B may include the frame clamps 66. It should be appreciated that a strap assembly 42 for detachment of the seatback carrier 22A from the seatback frame 14A, as described above and shown in the previous figures may also be used with a seat carrier 22B, a seat frame 14B, and a seat base 106B. It should be appreciated that the seat carrier 22B may include a cushion or other structure that may define the seating surface.

Figure 13:
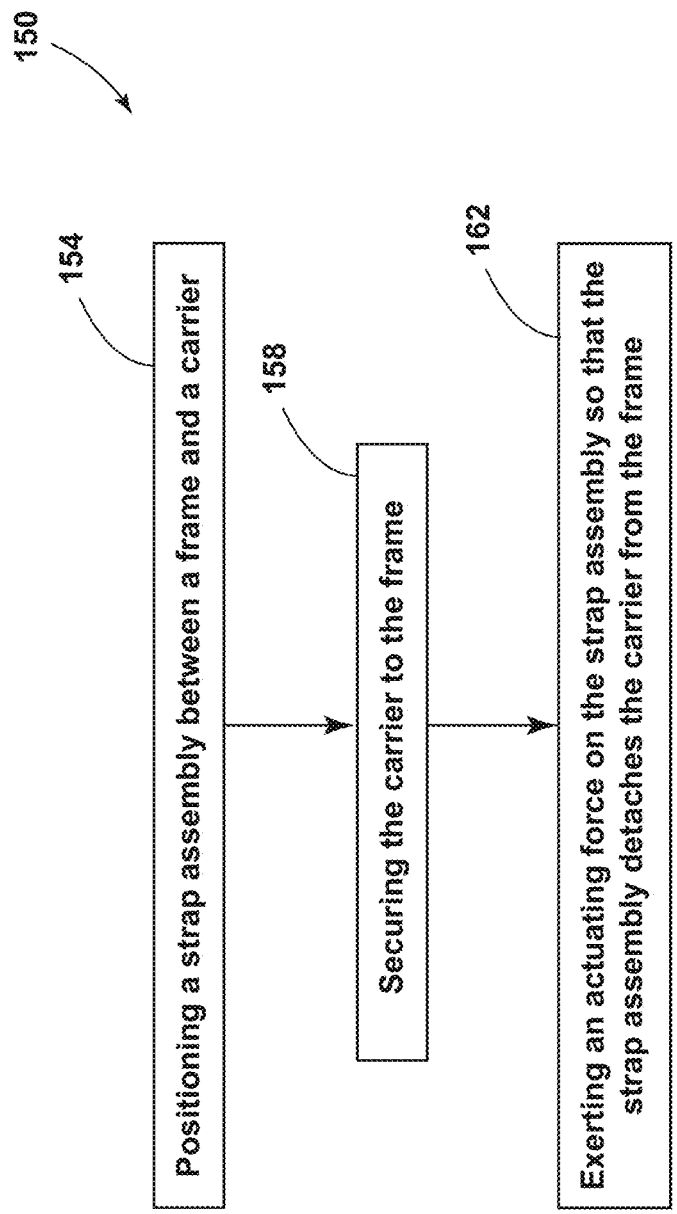
FIG. 13 is a flow diagram of a method for forming a vehicle seating assembly, according to an aspect of the present disclosure.

Referring to FIG. 13, a flow diagram of a method 150 for forming a vehicle seating assembly 10, according to an aspect of the present disclosure, is shown. The method 150 of forming a vehicle seating assembly 10 may include a step 154 for positioning a strap assembly 42 between a frame 14 and a carrier 22. The step 158 may include securing the carrier 22 to the frame 14. The step 162 may include exerting an actuating force F1 on the strap assembly 42 so that the strap assembly 42 may detach the carrier 22 from the frame 14.

It is to be understood that the frame clamp 66 of the carrier 22 and the engagement portion 62 of the frame 14 may be made in various configurations. The engagement portion 62 of the frame 14 may be various shapes other than the shapes shown. The frame clamp 66 of the carrier 22 may be various shapes other than the shapes shown. The frame clamp 66 of the carrier 22 and the engagement portion 62 of the frame 14 shall be designed so that they may form an interference fit 34 with the strap 30 disposed between the frame clamp 66 of the carrier 22 and the engagement portion 62 of the frame 14 and so that an actuating force F1 exerted on the strap 30 may detach the frame clamp 66 of the carrier 22 from the engagement portion 62 of the frame 14.

Referring now to FIGS. 14-20, alternate designs of the carrier 22 and frame clamp 66 are shown. With reference to FIGS. 14-17F, carrier 22-1 is shown with clamps 170. (FIGS. 14-17F.) With reference to FIGS. 18-20H, carrier 22-1 is shown with clamps 170A. Clamps 170 and clamps 170A may be disposed at the first ends 30A of the straps 30 of the strap assembly 42.

Figure 14:
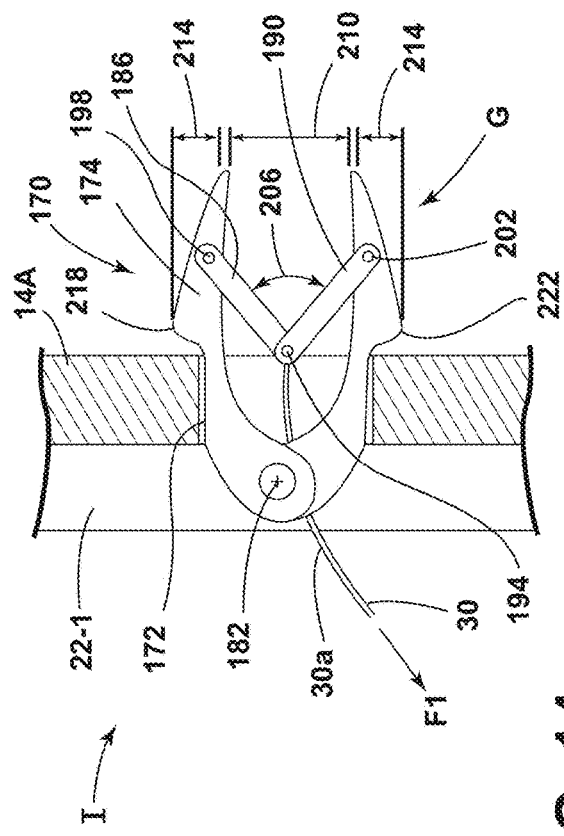
FIG. 14 is a cross-sectional view of a clamp disposed through an aperture in the frame with the clamp in the expanded position, according to an aspect of the present disclosure.
Figure 15:
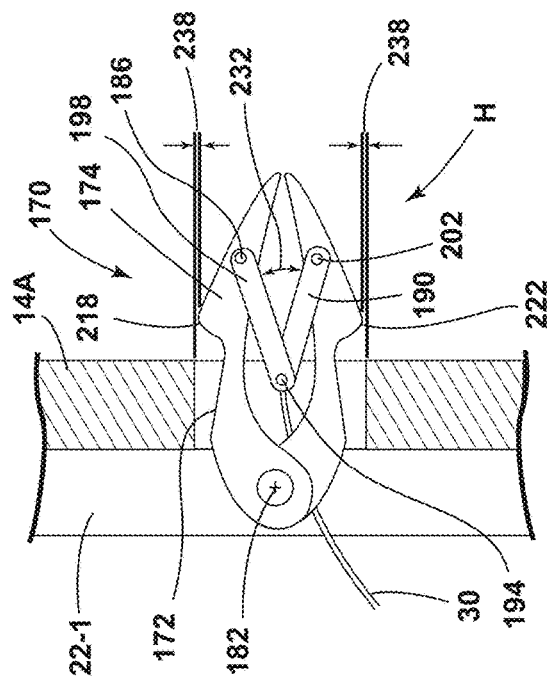
FIG. 15 is a cross-sectional view of the clamp of FIG. 14 disposed through an aperture in the frame with the clamp in the collapsed position, according to an aspect of the present disclosure.

Referring now to FIG. 14, the clamp 170 may be mounted to the carrier 22-1. The clamp 170 may extend through an aperture 172 in the frame 14A. The clamp 170 may include a first clamp member 174 and a second clamp member 178. The first clamp member 174 and the second clamp member 178 may be pivotably coupled to one another at a clamp pivotable coupling 182. The clamp 170 may include a first link 186 and a second link 190. The first link 186 and the second link 190 may each include an end pivotably coupled to a first clamp member 174 and a second clamp member 178. The first link 186 and the second link 190 may be connected to one another at a link pivotable coupling 194 disposed between the first clamp member 174 and the second clamp member 178. The first link-first clamp member pivotable coupling 198 and the second link-second clamp member pivotable coupling 202 may be disposed on the first clamp member 174 and the second clamp member 178, respectively. A strap 30 may extend from the link pivotable coupling 194. Application of an actuating force F1 on the strap 30 may cause the clamp 170 to move from the expanded position G to the collapsed position H. (FIG. 15.) In the collapsed position H, the link pivotable coupling 194 may be pulled toward the clamp pivotable coupling 182 to move the first clamp member 174 and the second clamp member 178 closer to one another and into the collapsed position H. The first and second links 186, 190 may form an angle 206 corresponding to the expanded position G of the first link 186 and the second link 190. The clearance portion 210 of the clamp 170 may show the size of the clamp 170 opening between the first clamp member 174 and the second clamp member 178. The lock portions 214 of the clamp 170 may show the height of the first and second shoulders 218, 222 of the first and second clamp members 174, 178.

Figure 17D:
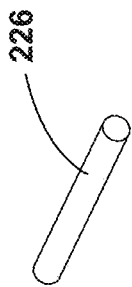
FIG. 17D is a perspective view of a dowel pin, according to an aspect of the present disclosure.

With continued reference to FIG. 14, the link pivotable coupling 194 between the first link 186 and the second link 190 may include a dowel pin 226. (FIG. 17D.) The first link-first clamp member pivotable coupling 198 between the first clamp member 174 and the first link 186 may include a dowel pin 226. The second link-second clamp member pivotable coupling 202 between the second clamp member 178 and the second link 190 may include a dowel pin 226. The first clamp member 174 and the second clamp member 178 may each include a bend that defines a respective first and second shoulder 218, 222 that may maintain the carrier 22-1 in the attached position I when the clamp 170 is in the expanded position G. In various aspects, a torsion spring 230 may be disposed at the clamp pivotable coupling 182. In various aspects, a compression spring 234 may be disposed between the first link-first clamp member pivotable coupling 198 and the second link-second clamp member pivotable coupling 202. In various aspects, a compression spring 234 may be disposed between the clamp pivotable coupling 182 and the link pivotable coupling 194.

With reference to FIG. 15, the clamp 170 is shown in the collapsed position H. The angle 232 between the first and second links 186, 190 may correspond to the collapsed position H. The angle 232 of the collapsed position H may be less than the angle 206 of the expanded position G. The clearances 238 are present between the first shoulder 218 and the frame 14A and the second shoulder 222 and the frame 14A. In the collapsed position H of the clamp 170, the first and second shoulders 218, 222 of the clamp 170 may pass through the aperture 172 in the frame 14A as the carrier 22-1 is removed from the frame 14A. As such, the clearances 238 may designate the spaces between the first and second shoulders 218, 222 and the frame 14A.

Figure 16:
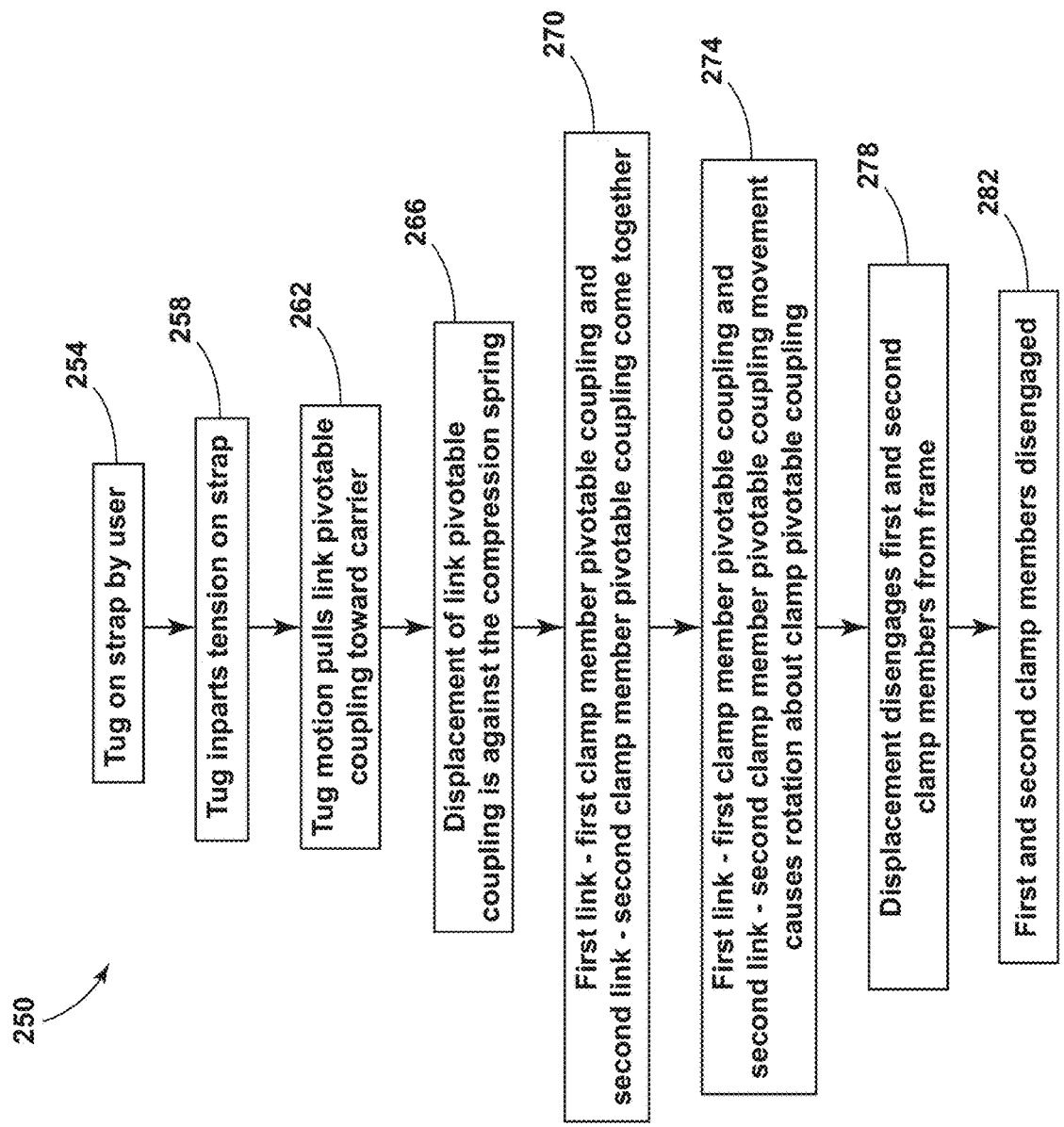
FIG. 16 is a flow diagram of a method of moving the clamp of FIG. 14 from the expanded position to the collapsed position, according to an aspect of the present disclosure.
Figure 17E:
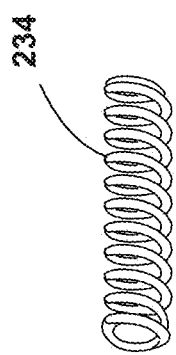
FIG. 17E is a perspective view of a compression spring, according to an aspect of the present disclosure.

With reference to FIG. 16, a method 250 of detaching the clamp 170 from the frame 14A is shown. In step 254, a user tugs on a strap 30. The tug of the user may exert the actuation force F1 on the strap 30. In step 258, the tug may impart tension (actuation force F1) on the strap 30. In step 262, the tug motion may pull the link pivotable coupling 194 toward the carrier 22-1. At step 266, the displacement of the link pivotable coupling 194 may be against the compression spring 234. (FIG. 17E.) At step 270, the first link-first clamp member pivotable coupling 198 and the second link-second clamp member pivotable coupling 202 may come together. At step 274, the first link-first clamp member pivotable coupling 198 and the second link-second clamp member pivotable coupling 202 coming together may cause a rotation about the clamp pivotable coupling 182. Step 278 involves displacement of the first clamp member 174 and the second clamp member 178 from the frame 14A. At step 282, the first clamp member 174 and the second clamp member 178 may be disengaged from the frame 14A. When the first clamp member 174 and the second clamp member 178 are disengaged from the frame 14A, the carrier 22-1 may be detached from the frame 14A.

Referring to FIGS. 17A-17F, previously referenced components of the clamp 170A are shown.

Figure 17F:
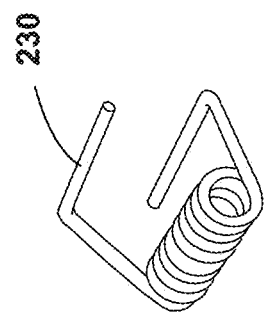
FIG. 17F is a perspective view of a torsion spring, according to an aspect of the present disclosure.
Figure 17A:
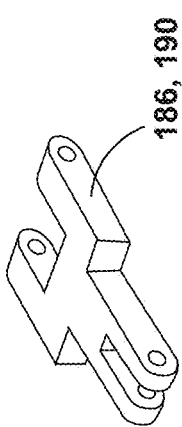
FIG. 17A is a perspective view of a link, according to an aspect of the present disclosure.

Referring to FIG. 17A, an example of a link that represents the first link 186 and the second link 190 is shown.

Figure 17B:
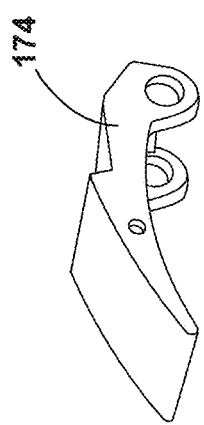
FIG. 17B is a perspective view of a first clamp member, according to an aspect of the present disclosure.

With reference to FIG. 17B, the first clamp member 174 is shown.

Figure 17C:
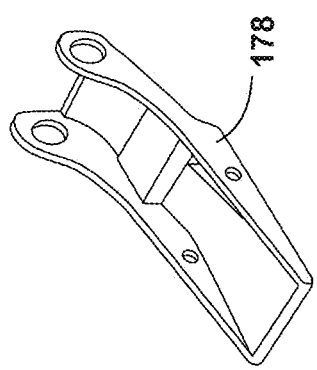
FIG. 17C is a perspective view of a second clamp member, according to an aspect of the present disclosure.

Referring to FIG. 17C, the second clamp member 178 is shown.

Referring to FIG. 17D, an example of a dowel pin 226 that may be disposed at the link pivotable coupling 194, the first link-first clamp member pivotable coupling 198, and the second link-second clamp member pivotable coupling 202 is shown.

With reference to FIG. 17E, the compression spring 234 that may be disposed between the clamp pivotable coupling 182 and the link pivotable coupling 194 is shown. The compression spring 234 may also be disposed between the first link-first clamp member pivotable coupling 198 and the second link-second clamp member pivotable coupling 202.

Referring now to FIG. 17F, a torsion spring 230 is shown. The torsion spring 230 may be disposed at the clamp pivotable coupling 182.

Figure 19:
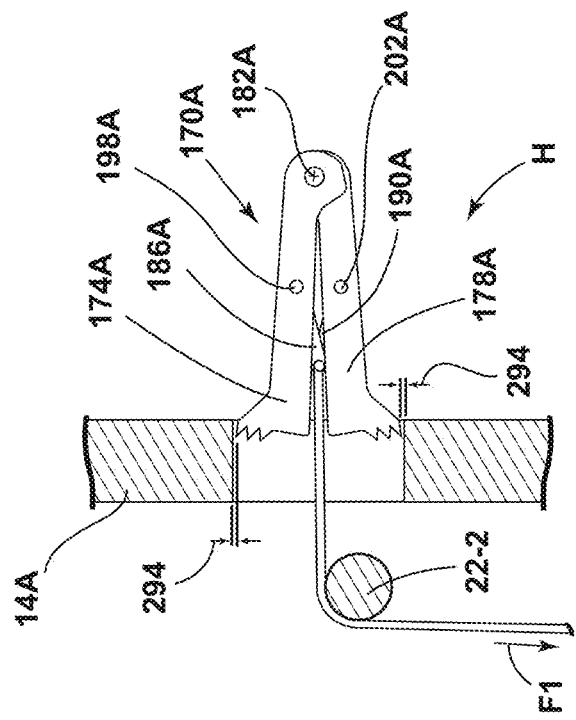
FIG. 19 is a cross-sectional view of the clamp of FIG. 18 disposed through an aperture in the frame with the clamp in the expanded position, according to an aspect of the present disclosure.
Figure 18:
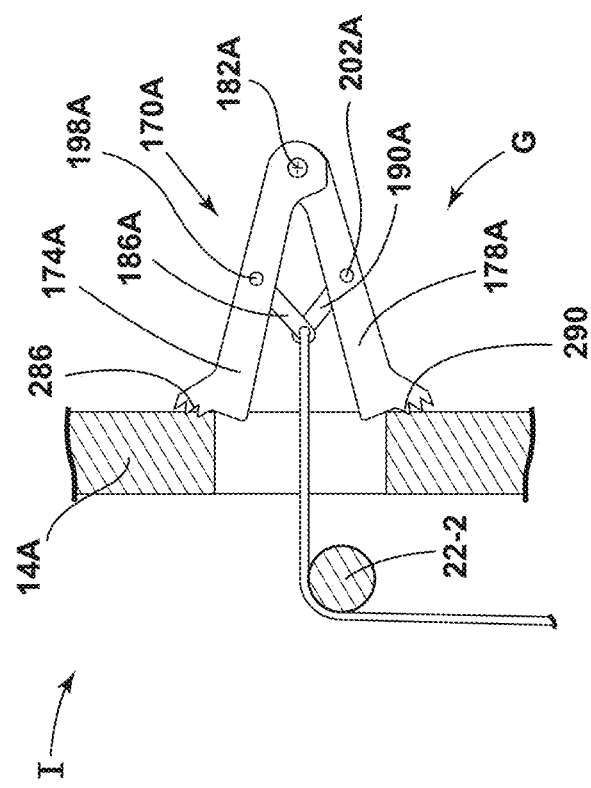
FIG. 18 is a cross-sectional view of a clamp partially disposed in an aperture in the frame with the clamp in the expanded position, according to an aspect of the present disclosure.

With reference to FIG. 18, a clamp 170A may be in an expanded position G relative to the frame 14A. The clamp 170A may be in the attached position I relative to the carrier 22-2. In the example shown, the first end 30A of the strap 30 may extend from a clamp 170A, over a substantially circular portion of the carrier 22-2, and towards a central portion of the frame 14A. The clamp 170A is shown in an expanded position G in FIG. 18. The clamp 170A may include a first clamp member 174A and a second clamp member 178A. Each of the first clamp member 174A and the second clamp member 178A may include respective first and second toothed portions 286, 290 at their ends. The first and second toothed portions 286, 290 may form an interference fit between the first clamp member 174A and the frame 14A and between the second clamp member 178A and the frame 14A. The toothed portions 286, 290 may minimize sliding of the first clamp member 174A and the second clamp member 178A along the frame 14A. The first clamp member 174A and a second clamp member 178A may be pivotably coupled to one another at a clamp pivotable coupling 182. The clamp 170A may include a first link 186A and a second link 190A. The first link 186A and the second link 190A may each include an end pivotably coupled to a respective first clamp member 174A or second clamp member 178A. The first link 186A and the second link 190A may be connected to one another at a link pivotable coupling 194A disposed between the first link 186A and the second link 190A. The first link-first clamp member pivotable coupling 198A and the second link-second clamp member pivotable coupling 202A may be disposed on the respective first clamp member 174A and the second clamp member 178A. A strap 30 may extend from the link pivotable coupling 194A. Application of an actuating force F1 on the strap 30 may cause the clamp 170A to move from the expanded position G to the collapsed position H. (FIG. 19.) In the movement between the expanded position G and the collapsed position H, the link pivotable coupling 194A is pulled toward the aperture 172 in the frame 14A to move the first clamp member 174A and the second clamp member 178A closer to one another and into the collapsed position H.

With reference to FIG. 19, the clamp 170A is shown in the collapsed position H. Clearances 294 between the first clamp member 174A and the frame 14A and the second clamp member 178A and the frame 14A are shown. A dowel pin 298 (FIGS. 20G and 20H) may define the clamp pivotable coupling 182A. A clock spring 302 (FIG. 20G) may be disposed around the dowel pin 298. A dowel pin 298 may be disposed at the clamp pivotable coupling 182. A dowel pin 298 may be disposed at the first link-first clamp member pivotable coupling 198A. A dowel pin 298 may be disposed at the second link-second clamp member pivotable coupling 202A.

Figure 20E:
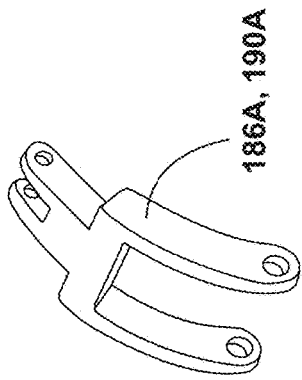
FIG. 20E is a perspective view of a link, according to an aspect of the present disclosure.
Figure 20F:
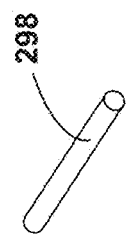
FIG. 20F is a perspective view of a dowel pin, according to an aspect of the present disclosure.
Figure 20G:
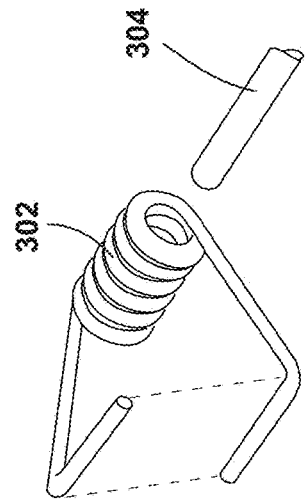
FIG. 20G is a perspective view of a clock spring, according to an aspect of the present disclosure.
Figure 20H:
FIG. 20H is a perspective view of a spring pin, according to an aspect of the present disclosure.
Figure 20A:
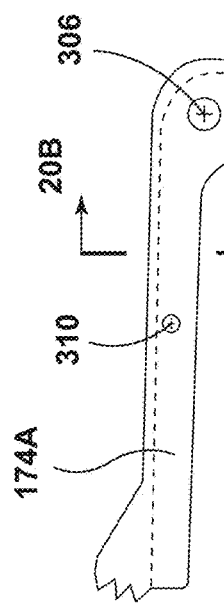
FIG. 20A is a perspective view of a first clamp member, according to an aspect of the present disclosure.

Referring to FIGS. 20A-20H, previously referenced components of the clamp 170A are shown. Referring to FIG. 20A, the first clamp member 174A may include an axis of rotation 306 defined by the clamp pivotable coupling 182A. The first clamp member 174A may also include an axis of rotation 310 defined by the first link-first clamp member pivotable coupling 198A.

Figure 20B:
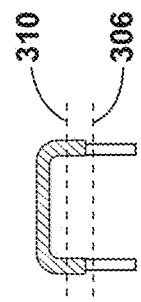
FIG. 20B is a cross-sectional view of the first clamp member taken along line 20B-20B of FIG. 20A.

With reference to FIG. 20B, a cross section taken along line 20B-20B of FIG. 20A is shown. The axis of rotation 306 may be defined by the clamp pivotable coupling 182A. The axis of rotation 310 may be defined by the first link-first clamp member pivotable coupling 198A.

Figure 20C:
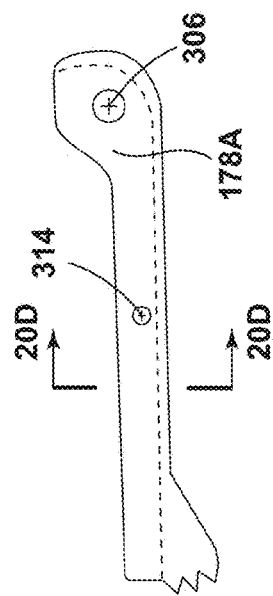
FIG. 20C is a perspective view of a second clamp member, according to an aspect of the present disclosure.

Referring now to FIG. 20C, a second clamp member 178A may include an axis of rotation 306 defined by the clamp pivotable coupling 182A. An axis of rotation 314 may be defined by the second link-second clamp member pivotable coupling 202A.

Figure 20D:
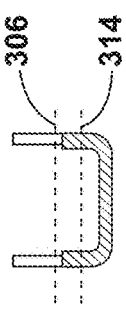
FIG. 20D is a cross-sectional view of the second clamp member taken along line 20D-20D of FIG. 20C.

With reference to FIG. 20D, a cross section taken along line 20D-20D of FIG. 20C is shown. The axis of rotation 306 may be defined by the clamp pivotable coupling 182A. The axis of rotation 314 may be defined by the second link-second clamp member pivotable coupling 202A.

Referring to FIG. 20E, an example of the first and second links 186A, 190A is shown.

Referring now to FIG. 20F, the dowel pin 298 is shown. A dowel pin 298 may be disposed at the first link-first clamp member pivotable coupling 198A and at a second link-second clamp member pivotable coupling 202A.

Referring to FIG. 20G, a clock spring 302 is shown. The clock spring 302 may be disposed at the clamp pivotable coupling 182A.

Referring to FIG. 20H, a spring pin 304 is shown. The spring pin 304 may be disposed within the clock spring 302. The spring pin 304 may define the axis of rotation 306 of the clamp pivotable coupling 182A.

A variety of advantages may be derived from the present disclosure. An actuating force F1 may be deployed to detach a carrier 22 from the frame 14. An operator may detach the carrier 22 from the frame 14 and attach the carrier 22 to the frame 14 with minimal or no assistance. The strap assembly 42 may be disposed within the seating assembly 10, and the strap assembly 42 may be used to detach the carrier 22 from the frame 14. The occupants may customize and swap out seatback cushions disposed within seatback carriers 22A and seat cushions disposed within seat carriers 22B to suit various occupant needs (for example, sport seatback carrier 22A and/or seat carrier 22B, comfort seatback carrier 22A and/or seat carrier 22B, seatback carrier 22A and/or seat carrier 22B for an occupant with posture problems). The frame clamps 66 may be integral to the carrier 22. The clamps 170, 170A may be integral to the respective carriers 22-1, 22-2. The clamps 170, 170A may be integral to the strap assembly 42. The carrier 22 may be made with conventional manufacturing or additive manufacturing technologies.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle seating assembly comprising:
a frame including:
an engagement portion;
a carrier; and
a plurality of straps disposed between the frame and the carrier, wherein if the carrier is in an attached position relative to the frame, then application of an actuating force to the strap moves the carrier to a detached position relative to the frame, wherein the plurality of straps each include a first end coupled to the frame and a second end coupled to a joining member disposed in a central portion of the frame.

2. The vehicle seating assembly of claim 1, further comprising:
a runner disposed in the carrier for receiving the plurality of straps.

3. The vehicle seating assembly of claim 1, further comprising:
a hook extending from the carrier and positionable around the frame when the carrier is in the attached position.

4. The vehicle seating assembly of claim 1, wherein the actuating force is exerted on the joining member to detach the carrier from the frame.

5. The vehicle seating assembly of claim 4, further comprising:
a pull member extending away from the joining member, wherein the actuating force is exerted on the pull member to detach the carrier from the frame.

6. The vehicle seating assembly of claim 5, wherein the joining member includes a ring.

7. The vehicle seating assembly of claim 1, wherein the engagement portion of the frame includes a substantially cylindrical portion, wherein the carrier includes a frame clamp, and wherein the substantially cylindrical portion and the frame clamp form an interference fit to secure the carrier to the plurality of straps.

8. The vehicle seating assembly of claim 1, wherein the engagement portion of the frame includes an aperture for receiving a clamp disposed on an end of the strap, wherein the clamp is movable between collapsed and extended positions, and wherein the clamp is configured to secure the plurality of straps to the frame.

9. A seating assembly comprising:
a frame including an engagement portion;
a carrier; and
a strap assembly arrangeable in a fixed position and a released position and including:
a strap including a first end and a second end, wherein the strap is fixedly secured to the frame if the strap assembly is in the fixed position, and wherein if an actuating force is applied to the strap, then the strap moves from the fixed position to the released position to detach the carrier from the frame, wherein the engagement portion of the fame includes an aperture and wherein the strap includes a clamp positionable in a collapsed position and an expanded position.

10. The seating assembly of claim 9, further comprising:
a runner for receiving the strap disposed in the carrier and substantially transverse to the engagement portion of the frame.

11. The seating assembly of claim 10, wherein the runner includes a recess.

12. The seating assembly of claim 11, wherein the runner includes a slot.

13. The seating assembly of claim 9, wherein the engagement portion of the frame includes a substantially cylindrical portion and wherein the carrier includes a frame clamp for receiving the substantially cylindrical portion.

14. The seating assembly of claim 9, wherein the strap includes a plurality of straps and wherein each of the plurality of straps includes a first end disposed proximate a perimeter of the frame and a second end coupled to a joining member disposed proximate a central portion of the frame.

15. The seating assembly of claim 14, wherein the joining member is disposed between the frame and the carrier.

16. A method of assembling a vehicle seating assembly comprising:
positioning a strap assembly between a frame and a carrier;
securing the carrier to the frame;
exerting an actuating force on the strap assembly so that the strap assembly detaches the carrier from the frame;
positioning a plurality of straps of the strap assembly in a corresponding plurality of runners of the carrier; and
arranging the plurality of straps so that a first end of each of the plurality of straps is fixed to an outer location of the frame and a second end of each of the plurality of straps is coupled to a joining member disposed an inner location of the frame.

* * * * *